United States Patent [19]

Maenza

[11] Patent Number: 5,602,388
[45] Date of Patent: Feb. 11, 1997

[54] ABSOLUTE AND DIRECTIONAL ENCODER USING OPTICAL DISK

[75] Inventor: Glenn J. Maenza, Glen Mills, Pa.

[73] Assignees: Sony Corporation, Tokyo, Japan; Sony Music Entertainment, Inc., New York, N.Y.

[21] Appl. No.: 304,014

[22] Filed: Sep. 9, 1994

[51] Int. Cl.$^6$ ....................................................... G01D 5/34
[52] U.S. Cl. ............................. 250/231.13; 250/231.16; 250/201.5; 369/44.26
[58] Field of Search ......................... 250/231.13, 231.14, 250/231.18, 231.16, 201.5; 341/13, 31; 369/44.26, 59, 56, 100, 275.5; 356/375

[56] References Cited

U.S. PATENT DOCUMENTS

| | | | |
|---|---|---|---|
| 3,862,428 | 1/1975 | Waters | 250/570 |
| 5,006,703 | 4/1991 | Shikunami et al. | 250/231.13 |
| 5,068,529 | 11/1991 | Ohno et al. | 250/231.18 |
| 5,107,107 | 4/1992 | Osborne | 369/44.26 |
| 5,179,482 | 1/1993 | Tanaka et al. | 360/97.01 |
| 5,227,930 | 7/1993 | Thanos et al. | 360/78.04 |
| 5,245,597 | 9/1993 | Lee et al. | 369/44.28 |

FOREIGN PATENT DOCUMENTS

| | | |
|---|---|---|
| 63-229640 | 9/1988 | Japan . |
| 2081539 | 2/1982 | United Kingdom . |

OTHER PUBLICATIONS

Optical Encoders, Dynamics Research Corporation, Jul., 1991.

Primary Examiner—Stephone Allen
Attorney, Agent, or Firm—Peter C. Toto; Jerry A. Miller

[57] ABSTRACT

A super high resolution rotary optical encoder having as its disk an optical disk, i.e., a disk employing the optical principle of non-contact readout based on diffraction theory. The encoder is adapted to be coupled to a device of which it is desired to measure the rotational motion thereof. The encoder includes an optical disk having, at a fixed radial distance, at least one track of pits and lands; a coupler for coupling the optical disk to the device such that rotary motion of the device results in a corresponding rotary motion of the optical disk; and an optical disk pick-up for generating an output in response to the pits and lands indicative of the rotary motion of the device.

13 Claims, 5 Drawing Sheets

ABSOLUTE AND DIRECTIONAL ENCODER USING OPTICAL DISK

BACKGROUND

1. Field of the Invention

This invention relates generally to encoders and more particularly to rotary encoders having an encoder disk which employs optical disk technology.

2. Background of the Invention

FIG. 1 shows a conventional rotary encoder 10. While the manufacture of this encoder refers to it as an "optical" encoder, such terminology will not be used herein. Rather, herein the term "optical" shall solely refer to a disk/readout system employing the optical principle of non-contact readout based on diffraction theory such as compact disks. In contrast, encoders of the type shown in FIG. 1 typically employ a conventional light emitting diode/photodetector combination as described below. The encoder 10 includes a shaft 12 and an output terminal 14. This particular encoder is a Model 35 incremental rotary encoder manufactured by Dynamics Research Corporation.

In typical operation, the shaft 12 is attached to a device (not shown) of which it is desired to measure the rotational motion thereof. In response to rotation of the device attached to shaft 12, output signals are generated via the output terminal 14 indicative of the motion. As known by those skilled in the art, to track this rotary motion, a disk internal to the rotary encoder 10 is provided. A typical disk 20 is shown in FIG. 2. The disk 20 is attached to the shaft 12 of encoder 10 so that it rotates with the shaft 12. The disk 20 is typically glass engraved via conventional IC lithography techniques to include a plurality of lines 22 (the arrows indicate that the lines 22 and 24 extend entirely around the circumference of the disk 20). A light emitting diode (not shown) is arranged on one side of the disk 20 and a photodetector (also not shown) is positioned on the other side. The light emitting diode/photodetector combination is fixed and does not rotate with the disk 20. As the device attached to the shaft 12 is rotated, the disk 20 also rotates and the lines 22 successively pass between the light emitting diode and photodetector inducing output signals indicative of the lines passing therebetween. Each line is equivalent to one cycle. With regard to the encoder shown in FIG. 1, a disk of 3.5 inches in diameter is designed for use therewith. Although disks can be provided with a various number of lines, the maximum number of lines available for this size and type of rotary encoder is in the range of 9000 lines (the lines 22 and 24 in FIG. 2 not being to scale). This is also referred to as the "count" of the encoder and results in a maximum of 9000 cycles per shaft revolution.

FIG. 3 shows the typical outputs for the rotary encoder 10. Although various output configurations can be provided, channels A and B (as well as their complementary channels) provide the primary outputs of the encoder 10 and can alternatively be generated in a sine wave form. Output A is generated by the lines 22 in FIG. 2 as described above. Output B is generated by a second light emitting diode/photodetector combination sensing a second set of lines 24 shown in FIG. 2. This second set of lines 24 is identical to the first set of lines 22 except that it is 90° out of phase from the first set of lines 22. Accordingly, output B is simply output A shifted by 30° or a quadrature wave form of output A. By having two output wave forms of the same frequency which are 90° out of phase, it is possible to determine the direction of motion of the disk 20 (FIG. 2) and, therefore, the device attached to disk 20. This is conventionally accomplished by providing the A and B signals as the "D" and "CLOCK" inputs, respectively, of a D-flip flop. As a result, if the Q output line is high, the disk is being rotated clockwise, if the $\bar{Q}$ output line is high, the disk is being rotated counterclockwise. Since the output on channels A and B provide 9000 cycles per shaft revolution, one cycle can be provided every 0.04° of rotation.

As known by those skilled in the art, internal and/or external cycle interpolation can be added to increase the number of counts per revolution. With regard to the specific rotary encoder shown in FIG. 1, for example, so-called external four times circuitry can be added to provide 36,000 counts per revolution, and internal ten times circuitry and external four times circuitry can be added to provide 360,000 counts per revolution. This type of circuitry, which can conventionally be added to any type of encoder including that described herein, of course, adds considerable expense and complexity to the encoder.

In certain fields such as compact disk manufacturing, super high resolutions, in the area of hundreds of thousands of counts per shaft revolution, are required. For instance, in the compact disk field, so-called Red Book requirements mandate that dimensions such as where lead-in starts and stops and track pitch, which is in the order of 1.5–1.7 microns, be measured. Conventional rotary encoders are simply not suitable for this type of measurement absent additional circuitry. Accordingly, it would be desirable to provide a super high resolution rotary encoder not requiring additional external or internal circuitry to obtain such resolutions.

SUMMARY OF THE INVENTION

It is an object of the present invention to provide a super high resolution rotary optical encoder. It is a further object of the present invention to provide an optical rotary encoder having as a disk an optical disk, i.e.,. a disk employing the optical principle of non-contact readout biased on diffraction theory.

Accordingly, an optical rotary encoder adapted to be coupled to a device of which it is desired to measure the rotational motion thereof is provided. The encoder includes an optical disk having, at a fixed radial distance, at least one track of pits and lands; a coupler for coupling the optical disk to the device such that rotary motion of the device results in corresponding rotary motion of the optical disk; and an optical disk pick-up for generating an output in response to the pits and lands indicative of the rotary motion of the device.

In one embodiment, the encoder includes two adjacent tracks of pits and lands, the second track is substantially identical to the first track except that it is ninety degrees out of phase from the first track. This provides a way to determine the direction of motion of the encoder.

In another embodiment, the optical rotary encoder incorporates an optical disk including a plurality of adjacent tracks separated by a small track pitch of approximately 0.6 microns, with each track having a substantially equivalent number of pits at substantially equivalent annular positions. Because of the track pitch and arrangement of the pits, only a single optical disk reader need be provided.

In still another embodiment, the optical rotary encoder has an optical disk including a plurality of adjacent tracks which, when read in parallel, indicate an absolute position of the encoder, with each one of the plurality of adjacent tracks representing one bit position of a binary number. The entire binary number is represented by the plurality of adjacent tracks. Preferably, the presence of a pit represents a binary zero and the presence of a land a binary one. A track representing a less significant bit than an adjacent track has twice as many pits as the adjacent track. A plurality of optical disk read means corresponding to the plurality of tracks for reading the plurality of adjacent tracks simultaneously and generating output signals corresponding thereto can also be provided.

DETAILED DESCRIPTION OF THE INVENTION

Figure 4:
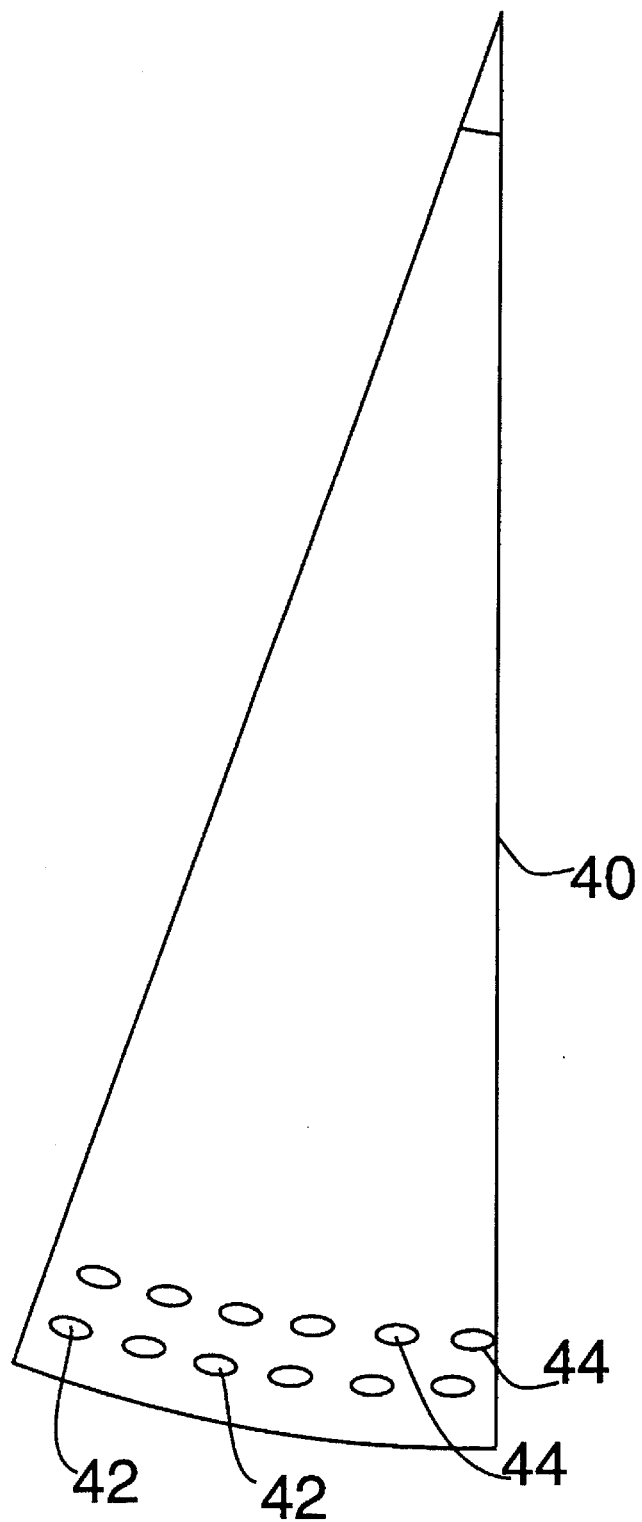
FIG. 4 is a section of an optical disk of the type employed with the present invention.

FIG. 4 shows a section of a compact disk 40 having a track including pits 42 (of course, these pits are not to scale) near its outermost circumference. The portions of disk on the track which are not pits are known as lands. Assuming the pits are so-called $I_{11}$ pits which are about 3.3 microns long, and further assuming a 50% duty cycle, in the case of a 3.5 inch diameter optical disk approximately 42,316 pits can be placed along the outer circumference. By employing conventional compact disk reading technology (described below), this disk can be used in an optical encoder providing 42,316 pulses per turn. If the pits are conventional $I_3$ pits, which are presently the smallest pits at about 0.8 microns in length, approximately 155,159 pulses per turn can be provided. This is approximately one turn every 0.00232°. In contrast, as described above, conventional encoders are in the range of 9000 pulses per turn or one pulse every 0.04°; an entire order of magnitude less.

As noted above, prior art encoders provide an A and B channel output. This type of output can also be easily incorporated into the present invention. In particular, a second track of pits 44 can optionally be added such that two pulse trains, A and B, can be generated. The second track of pits 44, track B, is a quadrature track 90° shifted from the first track of pits 42. If two tracks of pits 42 and 44 are employed, two pickups would likely be required so that the two tracks could be read simultaneously, i.e., in parallel.

Figure 1:
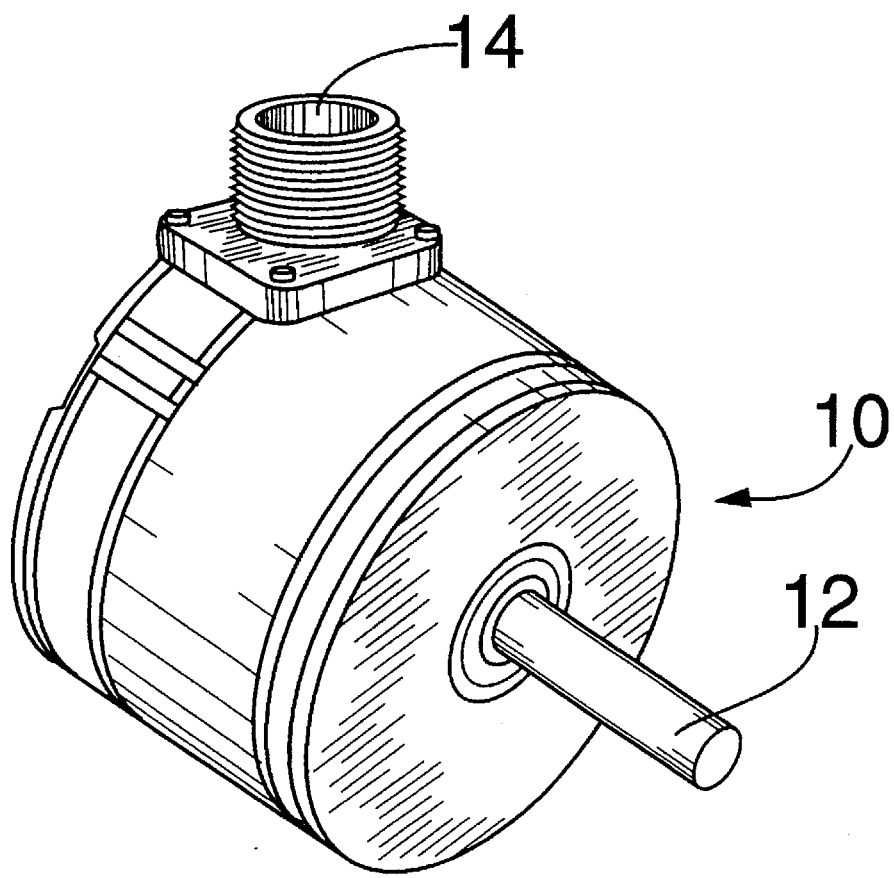
FIG. 1 is of a conventional prior art rotary encoder.
Figure 2:
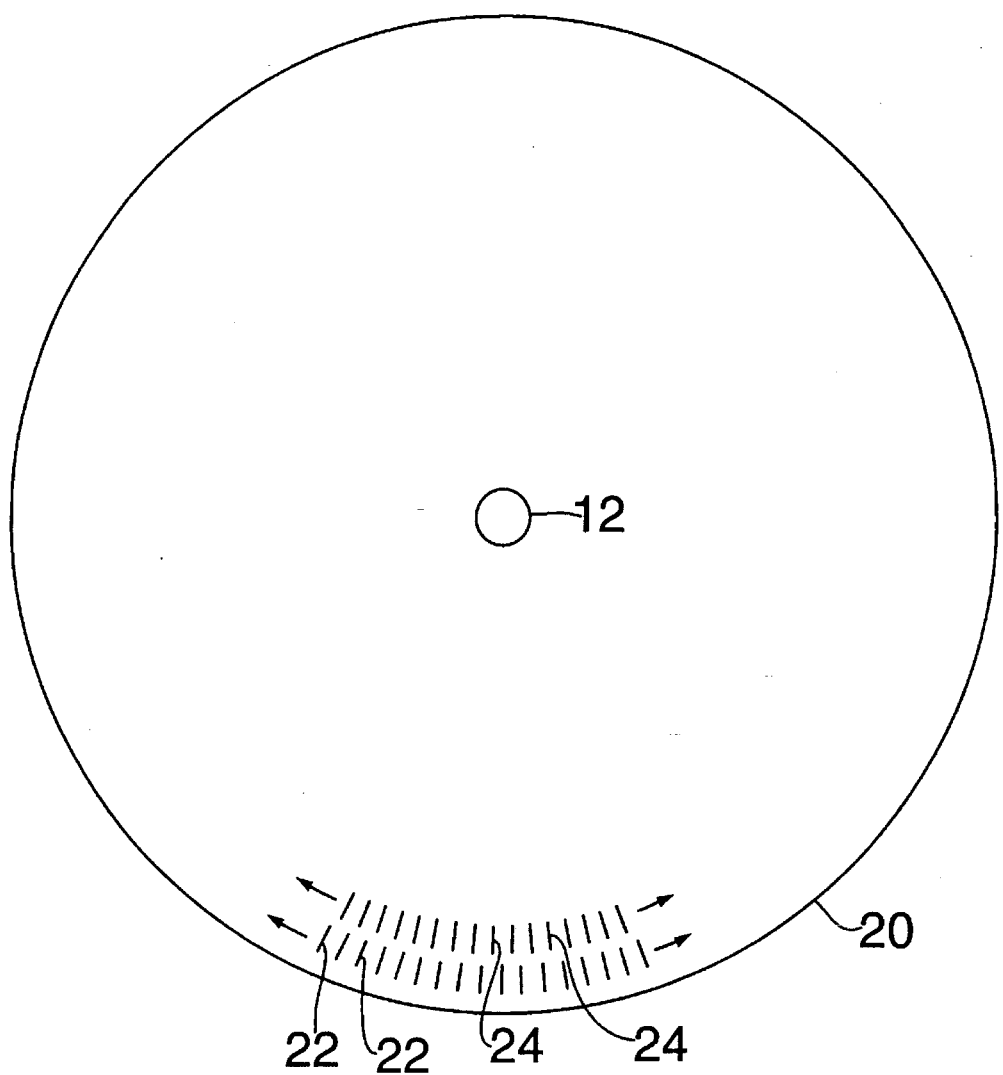
FIG. 2 is a disk of the type employed in the encoder of FIG. 1.
Figure 3:
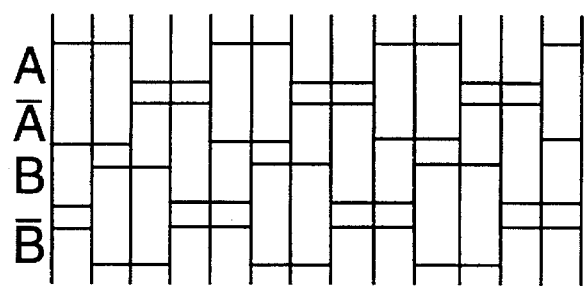
FIG. 3 is an example of the output produced by the encoder of FIG. 1.
Figure 5:
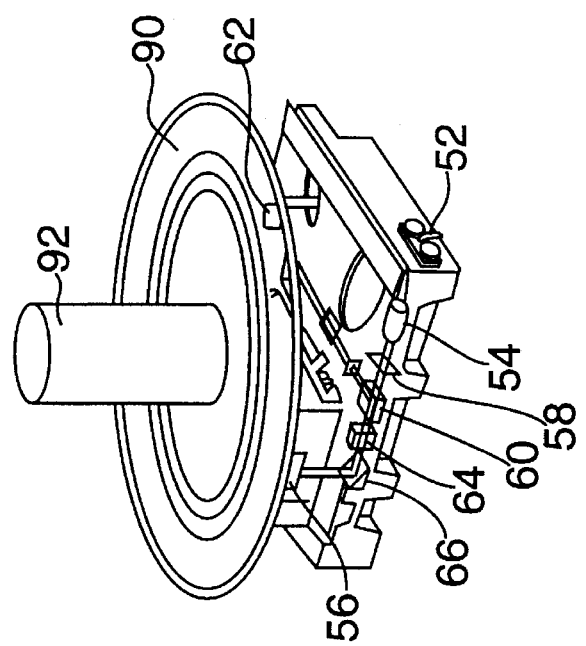
FIG. 5 is an exemplary arrangement of the optical encoder of the present invention.

FIG. 5 shows an exemplary arrangement for an optical encoder in accord with the present invention. Although numerous alternative arrangements are possible, the arrangement shown in FIG. 5 employs an optical pick-up mounted on an electrically movable sled that is designed to move laterally across an optical disk 90. The optical disk could be of the type shown in FIG. 4. A shaft 92 is attached to the optical disk 90. The shaft 92 is analogous to the shaft 12 of FIG. 1 and attached to a device (not shown) of which it is desired to measure the rotary motion thereof.

The device operates as follows: a low powered semiconductor laser 52 emits coherent Light of a single wave length. After leaving the laser, the beam first goes through a collimator lens 54 that makes the light beams parallel so they can be properly focused onto the disk by an objective lens 56 (described below). After the collimator lens 54, the light goes through a diffraction grating plate 58 where two small side beams are formed on either side of the main beam. This produces the popular "three beam" style used for radial tracking described below. A single beam type of system could also be used. After being diffracted, the light encounters a polarized beam splitter 60. The job of the polarized beam splitter 60 is to allow the incident beams to pass through to the disk but to redirect the reflected beam 90° to the photodiodes 62 where the reflections can be interpreted. As such, the polarized beam splitter 60 is designed to allow horizontally polarized light to pass directly through unchanged. Because the light beam from the laser 52 is at this point polarized horizontally, it will pass through on the way to the disk unaltered. However, the beam passes through a quarter-wave plate 64 after the polarized beam splitter 60 that gives the light a 90° phase shift. The reflected beam passes through the quarter-wave length plate 64 a second time on its way back from the disk giving it another 90° phase shift. The beam has now gone through a total 180° in-phase shift and is polarized vertically. The polarized beam splitter 60 does not allow the reflected vertically polarized beam to pass through. Instead, it is reflected 90° to the photodiodes 62.

Returning to the light traveling to the disk, the light reaches the objective lens 56 after the quarter-wave length plate 64 and right-angle prism 66 and just before reaching the optical disk 90. The objective lens 56 in conjunction with the transparent substrate of the optical disk 90 focuses the light to be small enough to read the tiny pits and lands, but not too small to be effected by dirt and small scratches on the surface of the disk.

The reflection of the finely focused light beam travels back through the objective lens 56, right-angle prism 66, quarter-wave length plate 64 and is deflected by the polarized beam splitter 60 onto the photodiodes 62 to a convex lens 68 and a cylindrical lens 70. In general the characteristics of the reflected light indicate the presence of a pit or land. The A and B pulse trains can be determined from the output of the photodiodes in conventional fashion. The convex lens 68 and cylindrical lens 70, together with the objective lens 56 are used to obtain the proper focus of the spot on the disk.

As known by those skilled in the art, since the range of focus of the optical pick-up is or by four microns, a greater variation in the flatness of the disk would result in errors. Because disk warp can cause high variations as large as 500–1000 microns in flatness, an automatic focus correction servo system must be employed. This type of focus correction servo is well-known to those skilled in the art and found in conventional CD players.

In addition to the focusing servo, conventional CD players typically employ a tracking or radial tracking servo to address the problem of radial mistracking since the width of each pit is only 0.6 microns, and the radial distance between tracks (track pit) is only 1.6 microns. Because of these very small distances and eccentricities in the disk, ,which can cause radial swings as large as 300 microns, a servo system is required to keep the laser on the proper track. These types of systems are also well-known by those skilled in the art. The system described in FIG. 5 employs a so-called three beam system that uses two side beams to maintain proper tracking. Accordingly, when a disk of the type shown in FIG. 4 is employed, i.e., a disk having one or two discrete tracks, a radial tracking servo is necessary in order to insure that the tracks are followed. As noted above, such servos are well-known by those skilled in the art and incorporated into almost every commercial CD player. Advantageously, however, in another embodiment of the present invention, no tracking servo is required.

Figure 6:
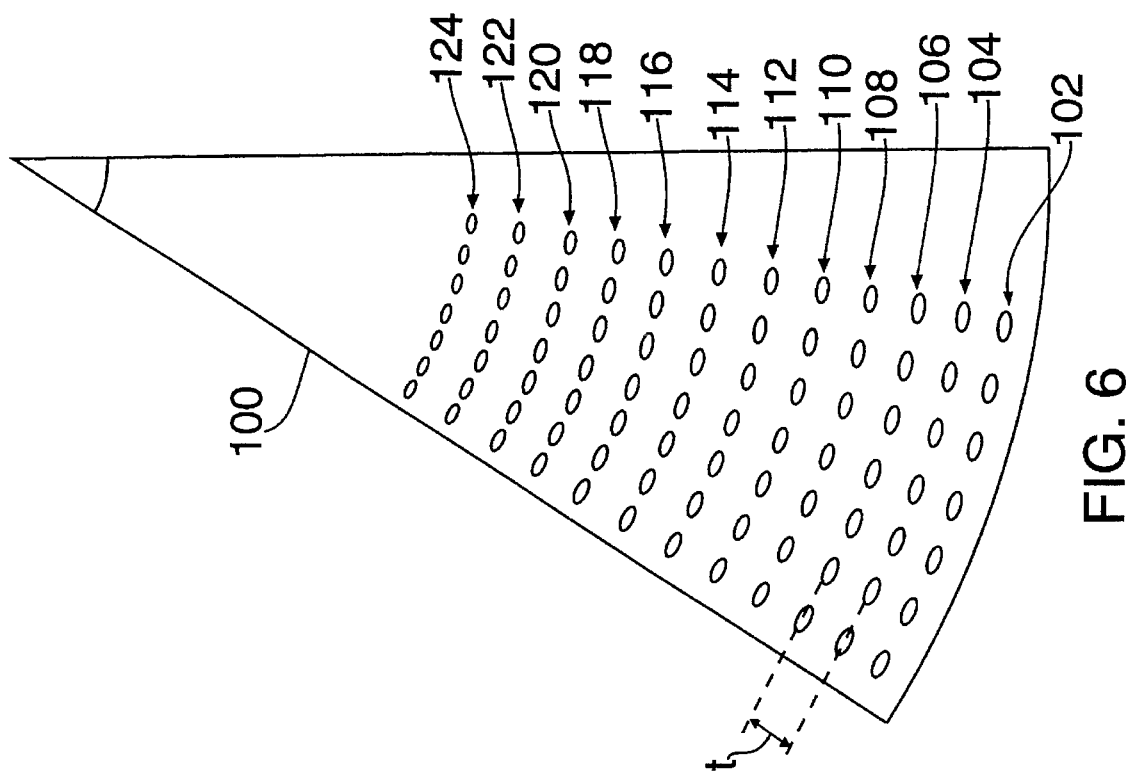
FIG. 6 shows a section of an alternative optical disk for use with the present invention.

In particular, FIG. 6 shows a portion of an optical disk 100 designed for use in an optical encoder without requiring a radial tracking servo. The disk of FIG. 6 is designed for use in a constant angular velocity type of arrangement where the tracks of pits 102–124 are arranged radially in phase. In an actual device preferably about 250 of these tracks arranged radially in phase would be suitable. If there were two channels, A and B as described above, each would require a set of about 250 tracks, with the sets being out of phase by 90°. Further, the track pitch (t) is reduced far below the typical 1.6 microns, to as low as 0.6 microns. As can be observed, each track contains an identical number of pits at identical angular positions. As such, no radial servo is required since the same information could be read from any number of parallel tracks. Thus, whether the pits on track 104, 112 or 122, for example, are read is irrelevant as they are equivalent. Further, since cross talk would be very desirably high in this type of arrangement, mistracking due to radial run out would not cause appreciable HF signal loss. Additionally, the three beam type of system exemplified in FIG. 5 would not be required.

Thus far, the above discussion has related to so-called incremental encoders. These B encoders employ outboard counters and determine the relative distance from a zero reference point based on the number of pulses received. Should a noise glitch, a power down or a failed counter situation occur, the process must be restarred as the reference is lost. Other types of encoders, known as absolute encoders, always retain their position even if the power goes off, the position being indicated by the information on the disk. Such an absolute encoder could also be embodied by the present invention by providing an optical disk having, for example, ten parallel tracks read simultaneously. The read-out from each of the tracks would then correspond to one bit of a ten bit code word representing the absolute position angular position of the disk. While this situation would typically require ten optical pick-ups as well as appropriate tracking servos to read the ten separate tracks, it is possible that a properly arranged laser/diode array pick-up could be used to read multiple tracks, e.g., four tracks, at the same time. These details are all within the purview of one of ordinary skill in the art.

Figure 7:
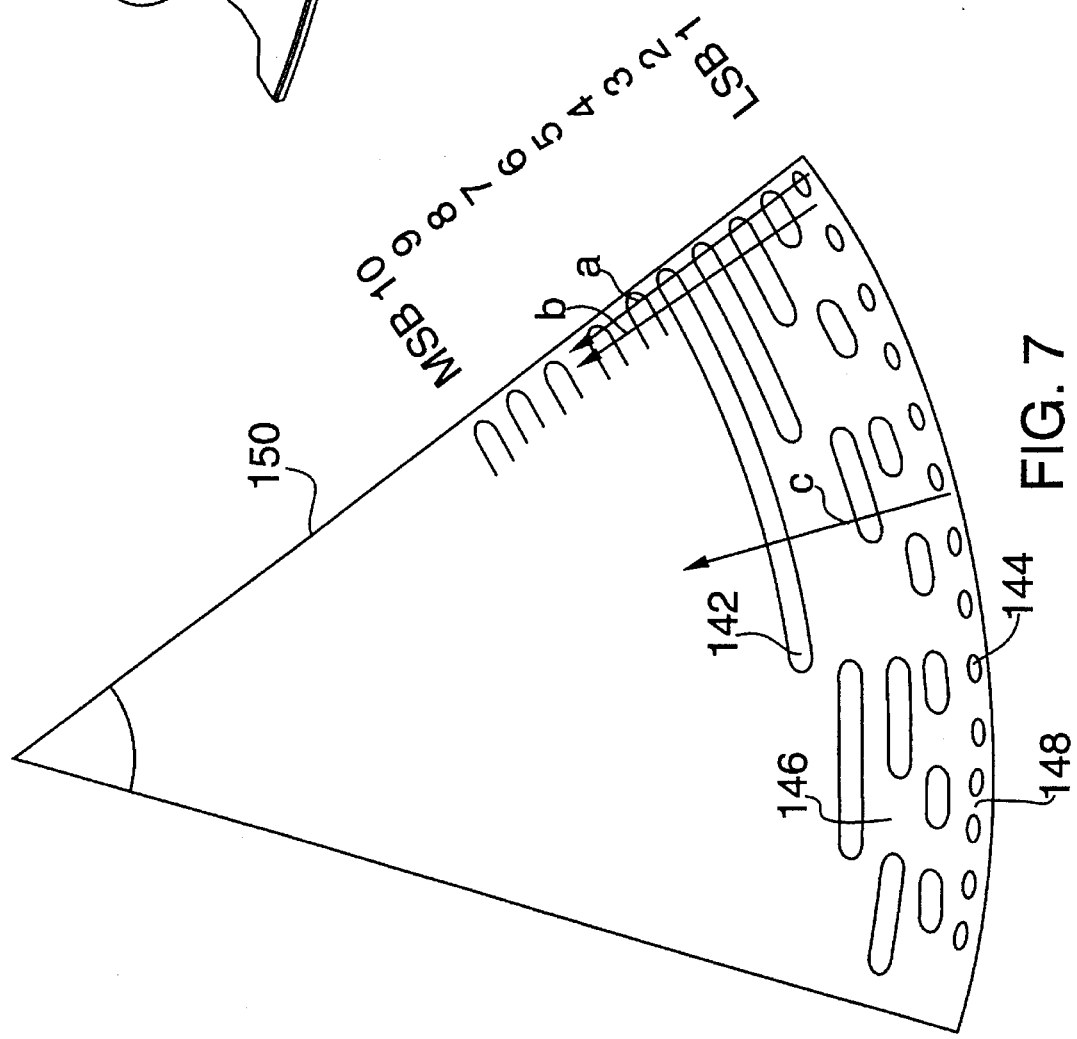
FIG. 7 shows a section of a second alternative optical disk for use with the present invention.

An example of such an optical disk is shown in FIG. 7. In this embodiment, a ten bit word is provided to indicate the absolute angular position of an optical disk 150. The number of bits is chosen at random and can be adapted to the particular situation. As there are ten bits from the least significant bit (LSB) to the most significant bit (MSB), 1024 discrete angular positions can be represented in binary. In this embodiment, the presence of a pit, e.g., 142, 144, indicates a binary zero and the presence of a land, e.g. 146, 148, indicates a binary one. Accordingly a first position indicated by line "a" has a pit at each bit position (or tracks 1–10) and is therefore represents the binary output 00 0000 0000 (note that only a portion of the first bit for the bit positions 6–10 is shown as each of these first bits would exceed the portion of the arc shown). A second position indicated by line "b" would have a binary output of 00 0000 0001. The eleventh position, indicated by "c", would have the binary output 00 0000 1011, up to the one thousand and twenty-fourth position (not shown) represented by the binary output 11 1111 1111. As can be observed, LSB+1 (track 2) has half as many pits as LSB (track 1), LSB+2 (track 3) has half as many pits as LSB+1 (track 2), etc.

If sixteen bits are used instead of ten, 65,536 angular positions can be represented; far exceeding the count of conventional rotary encoders. Note that while 16 separate optical pick-ups can be employed, one for each track, it is possible to use less with a laser/diode array pick-up arranged to read more than one track. For example, our such pick-ups can be employed each reading four tracks. With this type of absolute incremental encoder, should the power go off or some other disruption take place, the absolute position of the encoder can be determined by simply reading the parallel word. Again, this type of arrangement is based on a constant angular velocity theory and requires a number of pits and lands, in phase, on each track.

Furthermore, while the above-described absolute encoder used simple binary coding, other coding techniques could be employed. For example, a so-called Grey coding scheme could be employed. The Grey code insures that only one bit changes state for each increment of the encoder. This avoids common counting problems associated with multiple bit transitions, e.g., from 11 1111 1111 to 00 0000 0000.

Figure 8:
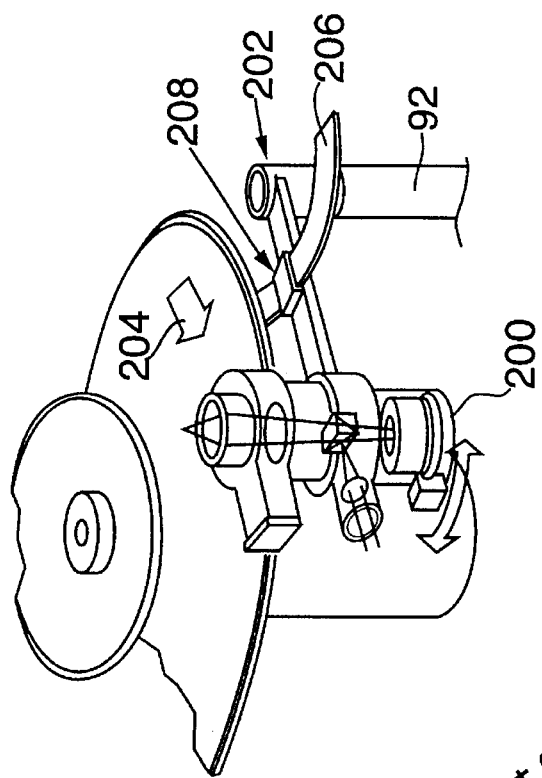
FIG. 8 shows a possible application for the present invention.

FIG. 8 shows a possible application for the optical encoder of the present invention in controlling the radial tracking of a CD ROM drive. Because the typical track pitch of a CD ROM is only 1.6 microns, very precise monitoring of motion is required. Thus, the high resolution provided by the optical encoder of the present invention provides the required precision for this type of arrangement. Specifically, FIG. 8 shows a CD ROM drive which uses an optical pick-up 200 mounted to a rotating arm 202 that sweeps across the CD 204. This drive is similar to the type of drive employed in the present invention except that it sweeps across the disk in a radial direction and, except, of course, that it is used to read the actual data on the disk. In this design, the radial tracking servo adjusts the radial tracking errors by moving the entire arm 202 in very small increments. The arm itself is mounted on a track 206, and a so-called radial tracking coil 208 is typically employed to measure the radial motion. Instead of the radial tracking coil, however, the optical encoder of the present invention can be mounted to the rotating arm 202. This is accomplished by affixing the shaft 92 of the optical encoder shown in FIG. 5 (only shaft 92 depicted in FIG. 8) to the rotary arm 202 so that rotation of the arm 202 will result in corresponding rotation of shaft 92 and disk 90. As the arm rotates, the A and B pulse trains will be generated, indicating motion of the arm. Any of the optical disks shown in FIG. 4, 6 or 7 could be used.

Similarly, the arrangement shown in FIG. 8 could be used in the compact disk mastering process to take measurements of, for example, the radial position where the lead-in of a sample disk 204 stops and/or starts to insure that the disk conforms to specification.

Thus, it is apparent that in accordance with the present invention, an apparatus that fully satisfies the objectives, aims and advantages is set forth above. While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. An optical rotary encoder adapted to be coupled to a device of which it is desired to determine the rotational motion thereof, comprising:

an optical disk having, at fixed radial distances, at least two substantially identical, adjacent tracks of pits and lands except that one of the tracks is approximately ninety degrees out of phase from the other of said tracks;

means for coupling said optical disk to said device such that rotary motion of said device results in corresponding rotary motion of said optical disk; and optical disk read means for reading the at least two substantially identical, adjacent tracks and generating an output in response to the pits and lands thereon indicative of the rotary motion of said device.

2. The optical rotary encoder of claim 1 wherein the duty cycle of said pits is fifty percent.

3. The optical rotary encoder of claim 1 comprising two optical disk read means for reading the at least two substantially identical, adjacent tracks simultaneously and generating output signals corresponding thereto.

4. The optical rotary encoder of claim 3 wherein the output signals are applied to D and CLOCK inputs, respectively, of a D-flip flop such that the state of an output line of the D-flip flop indicates the direction of rotation of the device.

5. The optical rotary encoder of claim 1 wherein the at least two substantially identical, adjacent tracks each include a plurality of adjacent tracks separated by a predetermined track pitch, each track having a substantially equivalent number of pits at substantially equivalent angular positions.

6. The optical rotary encoder of claim 1 wherein the track pitch of the at least two substantially identical, adjacent tracks is substantially less than 1.6 microns.

7. The optical rotary encoder of claim 1 wherein said pits are $I_{11}$ pits.

8. The optical rotary encoder of claim 1 wherein said pits are $I_3$ pits.

9. A method for determining the rotational motion of a device, comprising:

providing an optical disk having, at fixed radial distances, at least two substantially identical, adjacent tracks of pits and lands except that one of the tracks is approximately ninety degrees out of phase from the other of said tracks;

coupling said optical disk to said device so that the rotational motion of said device causes corresponding rotational motion of said optical disk; and reading the at least two substantially identical, adjacent tracks and generating an output in response to the pits and lands thereon indicative of the rotary motion of said device.

10. An optical rotary encoder adapted to be coupled to a device of which it is desired to determine the rotational motion thereof, comprising:

an optical disk including a plurality of adjacent tracks each having pits and lands, a combination of pits and lands on the plurality of adjacent tracks being distinct at various angular positions so as to indicate an absolute angular portion of the disk;

means for coupling said optical disk to said device such that rotary motion of said device results in corresponding rotary motion of said optical disk; and a plurality of optical disk read means corresponding to the plurality of adjacent tracks for reading the plurality of adjacent tracks simultaneously and generating output signals corresponding thereto.

11. The optical rotary encoder of claim 10 wherein each one of the plurality of adjacent tracks represents one bit position of a binary number comprising all of the plurality of adjacent tracks.

12. The optical rotary encoder of claim 11 wherein the presence of a pit represents a binary zero and the presence of a land a binary one.

13. The optical rotary encoder of claim 12 wherein a track representing a less significant bit than an adjacent track has twice as many pits as the adjacent track.

* * * * *